Jan. 24, 1933.  B. O. AUSTIN ET AL  1,894,971
AUTOMATIC CONTROL SYSTEM
Filed Feb. 28, 1931   2 Sheets-Sheet 1

INVENTORS.
Bascum O. Austin,
Norman H. Willby and
Ralph R. Brooks
BY
ATTORNEY

Jan. 24, 1933.  B. O. AUSTIN ET AL  1,894,971
AUTOMATIC CONTROL SYSTEM
Filed Feb. 28, 1931    2 Sheets-Sheet 2

WITNESSES:

INVENTORS.
Bascum O. Austin,
Norman H. Willby and
Ralph B. Brooks.
ATTORNEY

Patented Jan. 24, 1933

1,894,971

UNITED STATES PATENT OFFICE

BASCUM O. AUSTIN, OF FOREST HILLS, AND NORMAN H. WILLBY AND RALPH R. BROOKS, OF WILKINSBURG, PENNSYLVANIA, ASSIGNORS TO WESTINGHOUSE ELECTRIC AND MANUFACTURING COMPANY, A CORPORATION OF PENNSYLVANIA

AUTOMATIC CONTROL SYSTEM

Application filed February 28, 1931. Serial No. 519,004.

Our invention relates generally to motor-control systems and more particularly to systems for automatically controlling the acceleration and the deceleration of the propelling motors of electric vehicles.

An object of our invention, generally stated, is to provide an automatic control system which shall be simple and efficient in operation, and which may be economically manufactured and installed.

A more specific object of our invention is to provide an automatic dynamic braking system for the propelling motors of electric vehicles.

It is also an object of our invention to provide for varying the rate of deceleration of electric motors which are controlled by an automatic dynamic braking system.

Other objects of our invention will be apparent to those familiar with the art, as the specification proceeds.

For a fuller understanding of the nature and scope of the invention, reference may be had to the following detailed description, taken in conjunction with the accompanying drawings, in which.

Figures 1, 2:
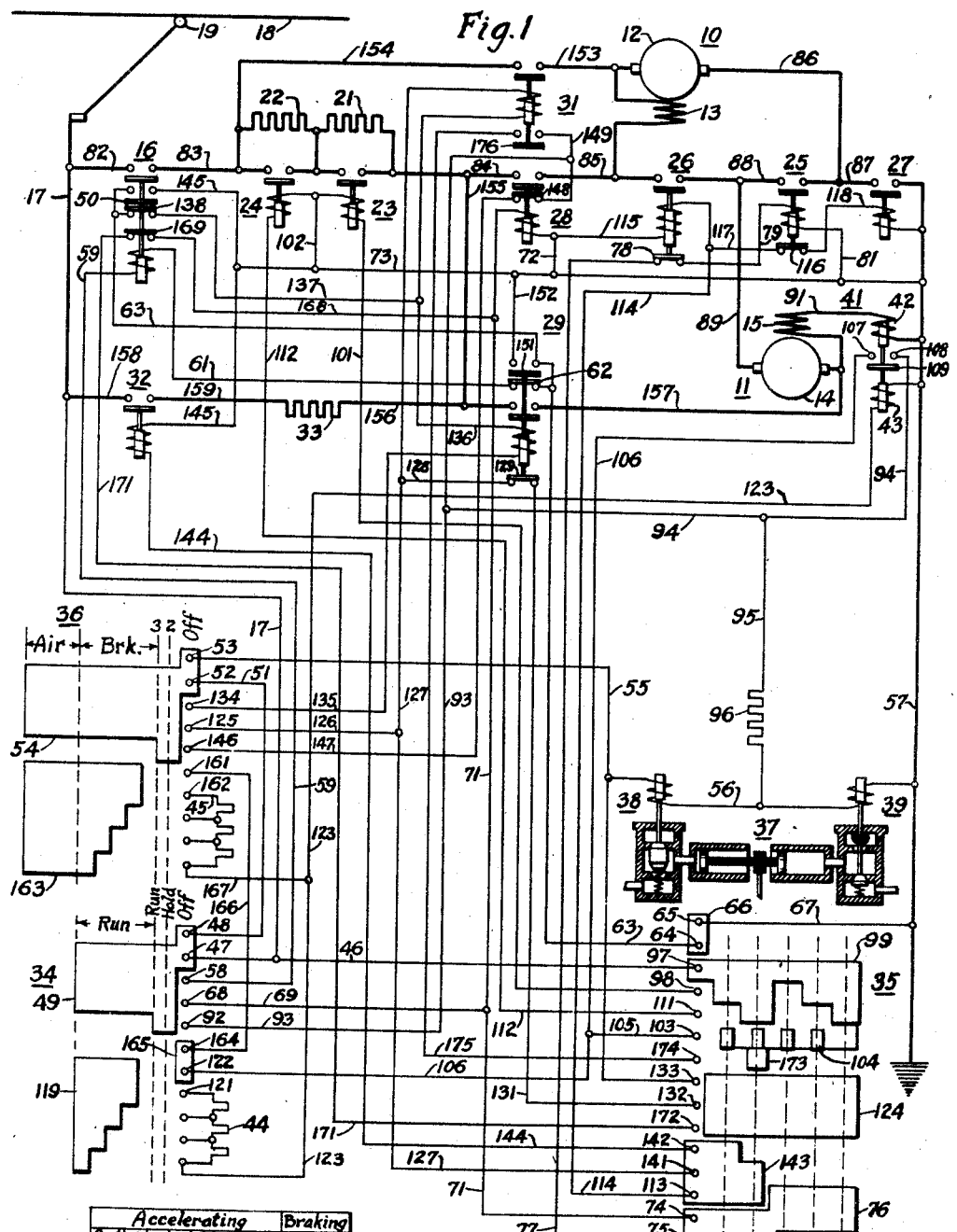
Figure 1 is a diagrammatic view showing the apparatus and the circuits of a motor-control system embodying our invention.
Fig. 2 is a chart showing the sequence of operation of a part of the apparatus shown in Fig. 1.

Our copending application, Serial No. 491,956 filed October 29, 1930 and assigned to the Westinghouse Electric & Manufacturing Company, discloses a control system that provides for varying the rate of acceleration of electric motors which are controlled by an automatic accelerating system, as is commonly used on electric railway vehicles. The present invention constitutes additions and improvements to the previous application and provides for varying the rate of deceleration of electric vehicles.

Referring to the drawings, two motors 10 and 11 are utilized for propelling an electric vehicle. The motors 10 and 11 may be of any type suitable for railway service. In the particular system illustrated, the motors are of the series type, the motor 10 having an armature winding 12 and a series field winding 13, and the motor 11 having an armature winding 14 and a series field winding 15.

In order that the motors 10 and 11 may be connected to a power source, a line switch 16 is provided for connecting the motors to a power conductor 17 which is energized from a trolley conductor 18 by means of a trolley wheel 19 or other suitable current collector.

In accordance with standard practice, a plurality of resistor sections 21 and 22 are provided for controlling the current supplied to the motors 10 and 11. In order to simplify the drawings and also the description, only two resistor sections are illustrated. It will be understood that as many sections as desired may be utilized.

The usual resistor shunting switches 23 and 24 are provided to shunt the resistor sections 21 and 22, respectively, in order that the current supplied to the motors 10 and 11 may be increased to cause the motors to accelerate in speed.

In the operation of electric vehicles, it is the usual practice to connect the driving motors in series-circuit relation for starting and then connect them in parallel-circuit relation after the vehicle has attained a predetermined speed.

An electrically operated switch 25 is provided for connecting the motors in series-circuit relation and similar switches 26 and 27 may be utilized to connect the motors in parallel-circuit relation. A switch 28 is provided to establish a connection between the motors and resistor sections 21 and 22.

In order that dynamic braking may be utilized to retard the vehicle driven by the motors 10 and 11, switches 29 and 31 are provided for establishing connections suitable for dynamic braking of the motors. A switch 32 is also provided for connecting a resistor 33 to the power conductor 17 during dynamic braking. The purpose of this resistor will be explained more fully hereinafter.

As is the usual practice in automatic control systems, an accelerating controller 34, of the drum type, is utilized for controlling the operation of the line switch 16 and the resistor switch 28 to connect the motors to the power source. The controller 34 also controls the position of a pneumatically operated sequence switch 35.

A braking controller 36 is provided for controlling the operation of the switches 29 and 31 which establish the dynamic braking connections.

In the preferred embodiment of our invention, the braking controller 36 is mechanically independent of the accelerating controller 34 and electrical interlocking is provided between the two controllers to give the desired sequence of operation of the apparatus controlled by the respective controllers. However, if desired, mechanical interlocking may be provided between the two controllers or the controllers may be combined into one unit.

The sequence switch 35 is provided to automatically control the operation of the resistor shunting switches 23 and 24 and also the switches 25, 26 and 27 which connect the motors 10 and 11 in either series or parallel-circuit relation. The sequence switch 35 may be of a standard type, well known in the art, and comprises a plurality of contact fingers which are disposed to engage contact segments mounted on a drum which is actuated by an air engine 37.

The operation of the air engine 37 is controlled by two magnet valves 38 and 39. The air engine is so constructed that when the actuating coils of both of the magnet valves 38 and 39 are deenergized, the drum of the sequence switch 35 is actuated toward the last position. If the coils of both magnet valves are energized simultaneously, the drum of the sequence switch 35 is actuated to the first position. The drum of the sequence switch may be retained in any intermediate position by energizing the actuating coil of the magnet valve 39 and deenergizing the coil of the magnet valve 38.

With a view to controlling the operation of the sequence switch 35 to automatically control the acceleration of the motors 10 and 11, a limit relay 41, which is responsive to the motor current, is utilized. The limit relay 41 is of the type described in our copending application Serial No. 491,956 and comprises a main or actuating coil 42 and a loading coil 43 which is disposed to oppose the actuating coil. The limit relay 41 is also utilized to control the motor current during the deceleration of the vehicle by dynamic braking, as will be explained more fully hereinafter.

It will be understood that the amount of current required in the actuating coil 42, of the limit relay 41, to actuate the relay to its uppermost position, will depend on the current supplied to the loading coil 43, which opposes the action of the main coil 42. The current supplied to the loading coil 43 may be controlled by a resistor 44, associated with the accelerating controller 34, or by a similar resistor 45, which is associated with the braking controller 36. Contact segments are provided on the respective controllers to shunt the various sections of the resistors 44 and 45 to control the current supplied to the loading coil 43.

In accordance with the usual practice, air-brake means are provided for retarding the vehicle in addition to dynamic braking of the motors 10 and 11. The air-brake system may be comprised of standard equipment, well known in the art, and will not be described in this specification. It will be readily understood that a mechanical means may be provided on the braking controller 36 for operating the air brake equipment when the controller handle is actuated to a predetermined position. In this manner both the dynamic braking and air braking may be controlled by the controller 36.

In order to describe the operation of the control system, it is assumed that the controllers 34 and 36 are in the positions illustrated in the drawings and that it is desired to connect the motors 10 and 11 to the power source to accelerate the motors.

When the controllers 34 and 36 are both in the "off" position, the magnet valves 38 and 39 are energized to return the sequence switch 35 to the first position, in case it is not already in that position. The energizing circuit for the actuating coils 38 and 39 may be traced from the power conductor 17, through conductor 46, contact fingers 47 and 48—bridged by a contact segment 49 of the controller 34, conductor 51, contact fingers 52 and 53—bridged by a contact segment 54 of the controller 36, conductor 55, the actuating coil of magnet valve 38, conductor 56 and the actuating coil of the magnet valve 39 to the grounded conductor 57.

As previously explained, when the coils of both of the magnet valves 38 and 39 are energized, the sequence switch 35 is actuated to the first position. The motors 10 and 11 may then be connected in series circuit-relation and connected to the power source in series with the resistor sections 21 and 22 by actuating the controller 34 to the second or "hold" position.

When the controller 34 is in the "hold" position, circuits are established which energize the actuating coils of the line switch 16, the series switch 25 and the resistor switch 28. The circuit for the actuating coil of the line switch 16 extends from the power conductor 17, through conductor 46, contact fingers 47 and 58—bridged by contact segment 49 of the controller 34, conductor 59, the actuating coil of the line switch 16, conductor 61, an interlock 62 on the switch 29, conductor 63, contact fingers 64 and 65—bridged by contact segment 66 on the sequence switch 35—and conductor 67 to the grounded conductor 57. A holding circuit for the actuating coil of the switch 16 is established when the switch is closed. The holding circuit extends from conductor 63, through an interlock 50 on the switch 16 and conductors 145 and 73 to the grounded conductor 57. The circuit for the actuating coil of the resistor switch 28 may be traced from the previously energized contact segment 49, through contact finger 68, conductors 69 and 71, the actuating coil of the switch 28 and conductors 72 and 73 to the grounded conductor 57. The circuit for the actuating coil of the series switch 25 may be traced from the previously energized conductor 71, through contact fingers 74 and 75 bridged by a contact segment 76 of the sequence switch 35, conductor 77, an interlock 78 on the switch 26, conductor 79, the actuating coil of the switch 25 and conductors 81 and 73 to the grounded conductor 57.

The motors 10 and 11 are now connected to the power source through a circuit which extends from the power conductor 17, through conductor 82, contact members of the line switch 16, conductor 83, resistors 22 and 21, conductor 84, the switch 28, conductor 85, the field winding 13 and armature winding 12 of the motor 10, conductors 86 and 87, contact members of the switch 25, conductors 88 and 89, the armature 14 and field winding 15 of the motor 11, conductor 91 and the series coil 42 of the limit relay 41 to the grounded conductor 57.

When the controller 34 is in the "hold" position, the actuating coil of the magnet valve 39 is energized and the coil of the magnet valve 38 is deenergized. Therefore, the sequence drum 35 is retained in the first position. The circuit for the actuating coil of the magnet valve 39 may be traced from contact finger 92, which engages the contact segment 49 of the controller 34 through conductors 93, 94 and 95, a resistor 96, conductor 56 and the actuating coil 39 to the grounded conductor 57.

Therefore, as long as the controller 34 is left in the "hold" position, the sequence switch 35 will not advance and the resistor sections 21 and 22 remain connected in the motor circuit. If it is desired to accelerate the motors, the controller 34 may be actuated to the "run" position. When the controller 34 is actuated to the "run" position, the energizing circuit for the magnet valve 39, which extends from the contact finger 92 through the circuit previously traced, is broken by the contact finger 92 becoming disengaged from the contact segment 49. Therefore, the sequence drum 35 is actuated to position "2".

When the sequence drum 35 is actuated to position "2", the resistor shunting switch 23 is closed to shunt the resistor section 21. The circuit for the actuating coil of the switch 23 extends from the previously energized conductor 46, through contact fingers 97 and 98—bridged by a contact segment 99 of the sequence switch 35—conductor 101, the actuating coil of the switch 23 and conductors 102 and 73 to the grounded conductor 57.

When the resistor section 21 is shunted by the switch 23, the current supplied the motors 10 and 11 is increased and the limit relay 41 is actuated to its closed position, thereby stopping the sequence switch 35 on position "2" by establishing a circuit to energize the actuating coil of the magnet valve 39. This circuit may be traced from a contact finger 103, which engages a portion 104 of the previously energized contact segment 99, through conductors 105 and 106, contact members 107 and 108—bridged by contact segment 109 of the limit relay 41, conductors 94 and 95, the resistor 96, conductor 56 and the actuating coil of the magnet valve 39 to the grounded conductor 57.

In this manner, the sequence switch 35 is retained on position "2" until the counter-electro-motive force of the motors reduces the motor current to a value which will permit the limit relay 41 to be opened, thereby interrupting the circuit through the actuating coil of the magnet valve 39.

Accordingly, the sequence switch 35 is actuated step-by-step to shunt the resistor sections which are connected in series with the motors 10 and 11. As previously explained, only two resistors are shown in order to simplify the drawings and the description.

When the sequence switch is actuated to position 3, the resistor shunting switch 24 is closed to shunt the resistor section 22. The circuit for the actuating coil of the switch 24 extends from a contact finger 111, which engages the previously energized contact segment 99, through conductor 112, the actuating coil of the switch 24, and conductors 102 and 73 to the grounded conductor 57.

As the sequence switch 35 is actuated from position 3 to position 4, circuits are established which energize the actuating coils of the switches 26 and 27 to connect the motors in parallel-circuit relation. The resistor shunting switches 23 and 24 are also permitted to open, thereby re-inserting the resistor sections 21 and 22 in the motor circuit. The circuit for the actuating coil of the switch 26 extends from contact finger 113, which engages the previously energized contact segment 76, through conductor 114, the coil of the switch 26 and conductors 115, 72 and 73 to the grounded conductor 57. The actuating coil of the switch 25 is deenergized when the switch 26 is closed as the circuit through the interlock 78 is broken. Therefore, the switch 25 opens and a circuit is established through an interlock 116 to close the switch 27. This circuit may be traced from the previously energized conductor 114, through conductor 117, the interlock 116 of the switch 25, conductor 118 and the actuating coil of the switch 27 to the grounded conductor 57.

Accordingly, the motors 10 and 11 are now connected in parallel-circuit relation and are connected to the power source in series with the resistors 21 and 22. The circuit for the motor 10 now extends from the power conductor 17, through conductor 82, the contact members of line switch 16, conductor 83, the resistors 22 and 21, conductor 84, the contact members of switch 28, conductor 85, the series field winding 13, armature winding 12, conductors 86 and 87, and the contact members of switch 27 to the grounded conductor 57. The circuit for the motor 11 may be traced from conductor 85, through the contact members of switch 26, conductors 88 and 89, the armature winding 14, the series field winding 15, conductor 91 and the series coil 42 of the limit relay 41 to the grounded conductor 57.

The sequence switch 35 will continue to advance step-by-step to close the resistor shunting switches 23 and 24, thereby increasing the motor current and causing the motors to accelerate in a manner well known in the art.

If it is desired to increase the rate of acceleration of the motors, the accelerating controller 34 may be actuated to a position in which a contact segment 119 will be engaged by a contact finger 121, thereby energizing the loading coil 43 of the limit relay 41, which increases the amount of current required to actuate the relay, and therefore increases the average value of accelerating current supplied to the motors, as previously explained. The circuit for the loading coil 43 may be traced from the contact finger 103, which is energized by the contact segment 104 as the sequence switch is advanced step-by-step, through conductors 105 and 106, contact fingers 122 and 121—bridged by the contact segment 119 of the controller 34, resistor 44, conductor 123 and the coil 43 to the grounded conductor 57.

The rate of acceleration may be further increased by actuating the controller 34 to a position in which either a portion or all of the resistor 44 is shunted by the contact segment 119, thereby controlling the amount of current supplied to the loading coil 43. In this manner the current required in the actuating coil 42 to operate the relay 41 may be varied. Accordingly, the rate at which the sequence switch 35 is permitted to advance to operate the resistor shunting switches may be governed. In this manner, the amount of current supplied the motors and, therefore, the rate of acceleration of the motors may be varied as desired.

If it is desired to retard the movement of the vehicle by dynamic braking, it is necessary to actuate the accelerating controller 34 to the "off" position. As previously explained, when the controller 34 is in the "off" position, control energy is supplied to the contact segment 54 of the braking controller 36 through the conductor 51 which is energized by the contact segment 49 of the controller 34. When the accelerating controller 34 is actuated to the "off" position, the circuits for the actuating coils of the line switch 16 and the resistor switch 28 are interrupted and these switches are permitted to open, thereby disconnecting the motors 10 and 11 from the power source.

When the braking controller 36 is in the "off" position, the actuating coils of the magnet valves 38 and 39 are energized through the conductor 55 which is energized by the contact segment 54. Therefore, the sequence switch 35 is returned to the first position and the resistor shunting switches 23 and 24 are opened.

As the braking controller 36 is actuated to the "hold" position, circuits are established which close the braking switches 29, 31 and 32, provided the sequence switch 35 is returned to the first position. In case the sequence switch has not returned to the first position by the time that the controller 36 is actuated to the second position, a circuit is established through a contact segment 124 on the sequence switch 35 which energizes the actuating coils of the magnet valves 38 and 39, thereby ensuring that the sequence switch will be returned to its first position. This circuit may be traced from a contact finger 125, energized by the contact segment 54, of the controller 36 through conductors 126, 127 and 128, an interlock 129 on the switch 29, conductor 131, contact fingers 132, 133 and bridged by the contact segment 124 of the sequence switch 35, conductor 55, the actuating coil of the magnet valve 38, the conductor 56 and actuating coil of the magnet valve 39 to the grounded conductor 57.

As soon as the sequence switch 35 is returned to the first position, the actuating coils of the switches 29, 31 and 32 are energized. The circuit for the actuating coil of the switch 29 may be traced from a contact finger 134 energized by the contact segment 54 of the controller 36, through conductor 135, the actuating coil of the switch 29, conductors 136 and 137, an interlock 138 on the switch 16, conductor 63, contact fingers 64 and 65—bridged by the contact segment 66 on the sequence switch 35—and conductor 67 to the grounded conductor 57. The circuit for the actuating coil of the switch 31 extends from the previously energized conductor 127, through the coil of the switch 31, the conductor 136 and thence to the grounded conductor 57 through the circuit just previously traced for the coil of the switch 29. The circuit for the actuating coil of the switch 32 extends from the previously energized conductor 127, through contact fingers 141 and 142—bridged by a contact segment 143 on the sequence switch 35—conductor 144, the actuating coil of the switch 32 and conductors 145 and 73 to the grounded conductor 57.

At the same time the actuating coils of the switches 26 and 27 are energized. The circuit for the coil switch 26 may be traced from the contact finger 113, which engages the energized contact segment 143, on the sequence switch 35, through conductor 114, the actuating coil of the switch 26, and conductors 115, 72 and 73 to the grounded conductor 57. The circuit for the actuating coil of the switch 27 extends from the energized conductor 114, through conductors 117, an interlock 116 on the switch 25, conductor 118 and the coil of the switch 27 to the grounded conductor 57.

When the braking controller 36 is in the second position, the actuating coil of the magnet valve 39 is energized to retain the sequence switch 35 on its first position. This circuit may be traced from a contact finger 146, which engages the energized contact segment 54, through conductor 147, an interlock 148 on the switch 28, conductors 149, 93, 94 and 95, the resistor 96, conductor 56 and the coil of the magnet valve 39 to the grounded conductor 57.

In order that the actuating coils of the switches 29 and 31 shall be kept energized after the sequence switch 35 is advanced from the first position, holding circuits are provided for the coils of the switches 29 and 31 by means of an interlock 151 on the switch 29. The holding circuit extends from the conductor 63, through the interlock 151, conductors 152 and 73 to the grounded conductor 57.

Figure 3:
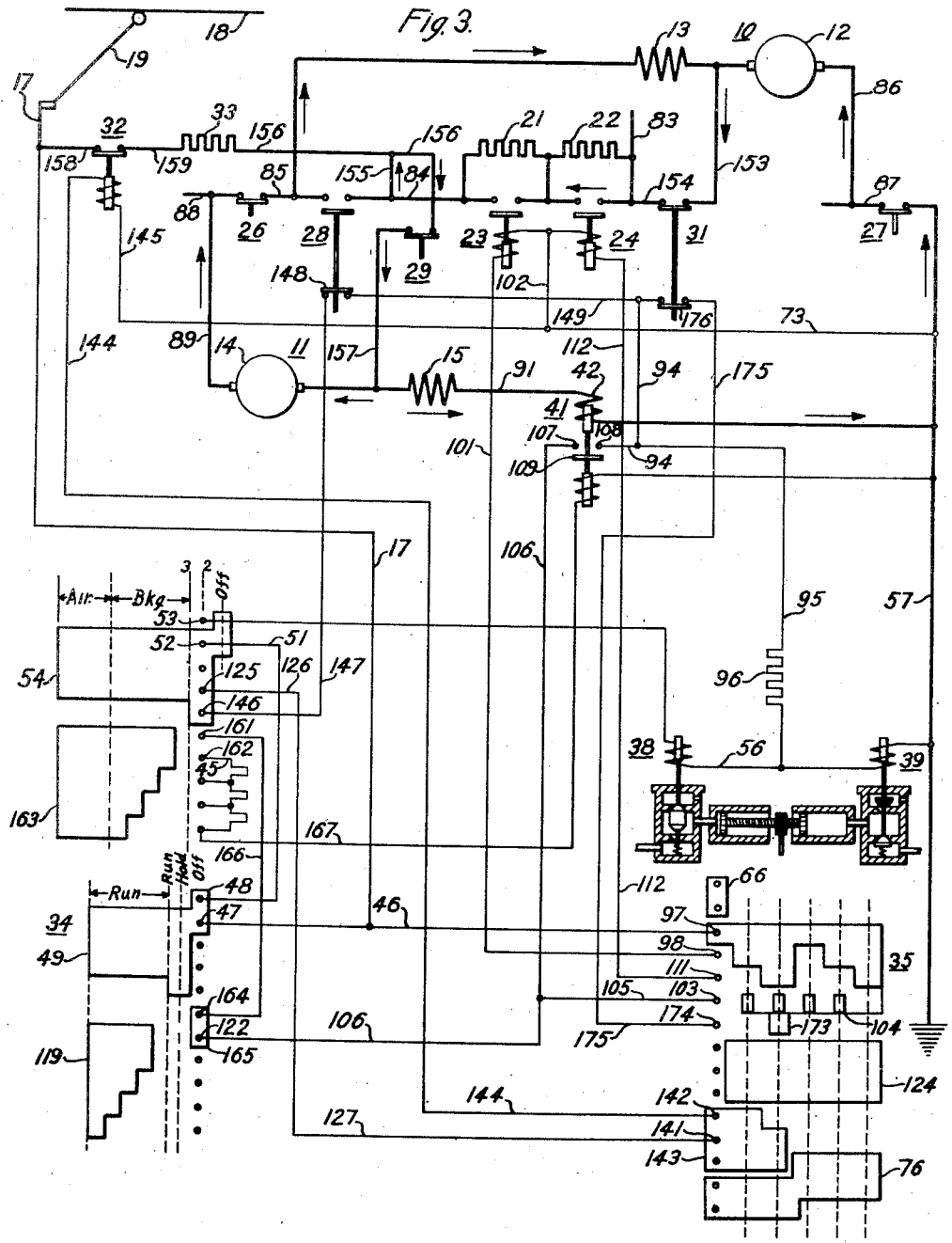
Fig. 3 is a diagrammatic view of a portion of the control system illustrated in Fig. 1, showing the dynamic braking connections for the motors.

When the switches 26, 27, 29 and 31 are closed, the motors 10 and 11 are so connected that the series field winding 13 of the motor 10 is in series-circuit relation with the armature winding 14 of the motor 11, also the series field winding 15 of the motor 11 is in series-circuit relation with the armature winding 12 of the motor 10, as shown in Fig. 3. In this manner, the direction of flow of current in the armature winding of each motor is reversed, but the direction of flow of current in the field windings is not changed. Therefore, the motors are caused to act as generators and dynamic braking is established. The resistor sections 21 and 22 are connected in the motor circuit to control the amount of current permitted to flow through the motor windings. The motor circuits may be traced from one side of the armature winding 12 of the motor 10, through conductor 153, the contact members of switch 31, conductor 154, the resistors 22 and 21, conductors 84, 155 and 156, the contact members of switch 29, conductor 157, the field winding 15 of motor 11, conductor 91, the series coil 42 of the limit relay 41, conductor 57, the contact members of switch 27 and conductors 87 and 86 to the other side of the armature winding 12. The circuit through the motor 11 may be traced from one side of its armature 14, through conductors 89 and 88, the contact members of switch 26, the field winding 13 of the motor 10, conductor 153, the contact members of switch 31, conductor 154, resistors 22 and 21, conductors 84, 155 and 156, the contact members of switch 29 and conductor 157 to the other side of the armature winding 14.

In order that the dynamic braking action of the motors shall be produced quickly, the field winding 15 of the motor 11 is separately excited from the power source. The resistor 33 is provided to limit the amount of exciting current supplied the field winding 15, which is connected to the power source, when the switch 32 is closed, through a circuit which extends from the power conductor 17, through conductor 158, the contact members of switch 32, conductor 159, the resistor 33, conductor 156, the contact members of switch 29, conductor 157, the field winding 15 of the motor 11, conductor 91, and the coil 42 of the limit relay 41 to the grounded conductor 57.

Separately exciting the field winding of one of the motors during dynamic braking not only causes the generator action of the motors to build up quickly by increasing the excitation on the field winding, but also produces a more stable operation of the motors, therefore giving smoother and more constant braking effort.

In order that approximately constant current shall be permitted to flow through the motor windings, as the motors decelerate in speed, to maintain a constant braking effort, the sequence drum 35 is advanced during the braking operation and the resistors 21 and 22 are shunted by the switches 23 and 24 in a manner similar to that previously described for the acceleration of the motors. The sequence switch may be caused to advance by actuating the controller 36 to the third position thereby denergizing the contact finger 146 and interrupting the circuit through the actuating coil of the magnet valve 39. The sequence switch 35 is permitted to advance step-by-step in the same manner as during the acceleration of the motors, which has been previously described.

However, the sequence switch 35 is stopped on position "3" by a contact segment 173, which establishes a circuit through the coil of the magnet valve 39. This circuit extends from a contact finger 174, which is energized by the contact segment 173, through conductor 175, an interlock 176, on the switch 31, conductors 149, 93, 94 and 95, resistor 96, conductor 56, and the coil of the magnet valve 39 to the grounded conductor 57.

With a view to providing for varying the rate of deceleration of the motors in a manner similar to that by which the accelerating rate is varied, the loading coil 43 of the limit relay 41 may be energized by actuating the controller 36 to a position in which the contact fingers 161 and 162 engage a contact segment 163. The circuit for the coil 43 may be traced from a contact finger 103 of the sequence switch 35, which is energized by the contact segments 104 as the sequence switch advances step-by-step, through conductors 105 and 106, contact fingers 122 and 164—bridged by a contact segment 165—of the controller 34, conductor 166, contact fingers 161 and 162—bridged by the contact segment 163 of the controller 36, the resistor 45, conductors 167 and 123 and the coil 43 to the grounded conductor 57.

If it is desired to increase the rate of deceleration of the vehicle, the amount of current permitted to flow in the motor circuit may be increased by actuating the controller 36 to a position in which the contact segment 163 will shunt the resistor 45, thereby increasing the amount of current supplied to the loading coil 43 of the limit relay 41. In this manner the current required to actuate the relay 41 is increased and the sequence switch 35 is permitted to advance at a more rapid rate which causes the resistors 21 and 22 to be shunted from the motor circuit in quicker sequence. Accordingly, the rate of deceleration of the vehicle as well as the rate of acceleration of the vehicle may be controlled to suit the operating conditions.

As previously explained, the controller 36 may be mechanically connected to the air brake system so that the air brakes will be applied when the controller 36 is actuated to a predetermined position. In this manner, the air brakes may be applied simultaneously with dynamic braking to retard the movement of the vehicle.

From the previous description it will be understood that the controllers 34 and 36 are so electrically interlocked that it is impossible to establish the motor connections for dynamic braking while power is being applied to the motors, as it is necessary for the controller 34 to be in the "off" position before control energy is supplied to the segment 54 of the controller 36. However, it is possible to apply the air brakes to the vehicle when the motors are connected to the power source by actuating the handle of the controller 36 to a position to cause the air brake system to function.

It will also be understood that power will always be supplied to the motors to cause them to accelerate in case the accelerating controller is actuated from the "off" position, irrespective of the position of the braking controller 36. As previously explained, the contact segment 54 of the braking controller 36 is deenergized when the controller 34 is actuated from the "off" position. Therefore, the actuating coils of the switches 29, 31, and 32 are deenergized and these switches are permitted to open, thereby interrupting the circuits which establish dynamic braking.

When the controller 34 is actuated to the second position, a circuit is established through the contact segment 124 of the sequence switch 35 which ensures that the sequence switch will be returned to its first position, in case it is not already in that position. This circuit may be traced from the contact finger 68, which engages the contact segment 49, of the controller 34 through conductors 69, 71 and 168, an interlock 169 on the line switch 16, conductor 171, contact fingers 172 and 133—bridged by the contact segment 124—of the sequence switch 35, conductor 55, the actuating coil of the magnet valve 38, conductor 56 and the actuating coil of the magnet valve 39 to the grounded conductor 57. In this manner, the sequence switch will always be returned to a position which will permit power to be supplied to the motors, when the controller 34 is actuated from the "off" position.

From the foregoing description it will be evident that we have provided a control system which permits both the rate of acceleration and the rate of deceleration of an electrically propelled vehicle to be varied at the will of the operator to meet the conditions encountered in operating a vehicle through modern traffic conditions. We have also provided for retarding the movement of the vehicle by dynamic braking of the driving motors, which is automatically controlled by the same equipment that controls the acceleration of the vehicle, thereby effecting a great saving in the cost of the equipment and the space required to install the equipment on a vehicle.

Since many modifications may be made in the apparatus and arrangements of parts without departing from the spirit of our invention, we do not wish to be limited other than by the scope of the appended claims.

We claim as our invention:

1. In a motor-control system, in combination, a plurality of motors, a plurality of switches for controlling the acceleration and the deceleration of the motors, means for controlling the operation of the switches to cause the motors to accelerate and decelerate at a predetermined rate, and means responsive to the current flowing in the motors for controlling the actuation of the switch-controlling means to vary the rate of acceleration and deceleration of the motors.

2. In a motor-control system, in combination, a plurality of motors, a plurality of switches for controlling the acceleration and the deceleration of the motors, means responsive to the current flowing in the motors for controlling the operation of the switches, and means for varying the current required to actuate the switch-controlling means to vary the rate of acceleration and deceleration of the motors.

3. In a motor-control system, in combination, a plurality of motors, a plurality of resistor sections to control the motor current during acceleration and deceleration, a plurality of switches for shunting the resistor sections, a relay responsive to the current flowing in the motors for controlling the operation of the switches, and means for varying the current required to actuate the relay, whereby the rate of acceleration and deceleration of the motors may be varied.

4. In a motor-control system, in combination, a plurality of motors, a plurality of resistor sections to control the motor current during acceleration and deceleration, a plurality of switches for shunting the resistor sections, means for controlling the operation of the switches, a relay responsive to the motor current for controlling the actuation of the switch-controlling means, said relay having an actuating coil and a loading coil disposed to oppose the actuating coil, and means for varying the force exerted by the loading coil to vary the current required to actuate the relay, whereby the rate of acceleration and deceleration of the motors may be varied.

5. In a motor-control system, in combination, a plurality of motors, a plurality of resistor sections to control the motor current during acceleration and deceleration, a plurality of switches for shunting the resistor sections, means for controlling the operation of the resistor-shunting switches, a plurality of switches for establishing motor connections suitable for acceleration or for dynamic braking, means for controlling the operation of said switches, a relay responsive to the motor current for controlling the actuation of the resistor-shunting switch controlling means, said relay having an actuating coil and a loading coil disposed to oppose the actuating coil, and means for varying the force exerted by the loading coil to vary the current required to actuate the relay during acceleration and dynamic braking of the motors, whereby the rate of acceleration and deceleration of the motors may be varied.

6. In a motor-control system, in combination, a plurality of motors, a plurality of resistor sections to control the motor current during acceleration and deceleration, a plurality of switches for shunting the resistor sections, a sequence switch for controlling the operation of the resistor-shunting switches, a plurality of switches for establishing motor connections suitable for acceleration or for dynamic braking, a controller for controlling the operation of said switches, a relay responsive to the motor current for controlling the actuation of the sequence switch, a controller for controlling the position of the sequence switch, said relay having an actuating coil and a loading coil disposed to oppose the actuating coil, and means associated with said controllers for varying the force exerted by the loading coil to vary the current required to actuate the relay during acceleration and dynamic braking of the motors whereby the rate of acceleration and deceleration of the motors may be varied.

7. In an electric vehicle, in combination, a plurality of motors for propelling the vehicle, a source of power for the motors, means for connecting the motors to the power source to accelerate the motors, means for establishing motor connections to decelerate the vehicle by dynamic braking of the motors, air brake means for decelerating the vehicle, means for controlling the application of air brake means for decelerating the vehicle simultaneously with the dynamic braking, and interlocking means for preventing the simultaneous operation of the accelerating and the dynamic braking means but permitting the simultaneous operation of the accelerating and the air brake means.

8. In an electric vehicle, in combination, a plurality of motors for propelling the vehicle, a source of power for the motors, a plurality of switches for connecting the motors to the power source to accelerate the vehicle, a controller for controlling the operation of the accelerating switches, a plurality of switches for establishing motor connections to decelerate the vehicle by dynamic braking, air brake means for decelerating the vehicle, a controller for controlling the operation of the dynamic braking switches and the air brake means, and interlocking means associated with said controllers and disposed to prevent the simultaneous operation of the accelerating and the dynamic braking switches but permitting the simultaneous operation of the air brake means and the accelerating switches.

In testimony whereof, we have hereunto subscribed our names this 17th day of February, 1931.

BASCUM O. AUSTIN.
NORMAN H. WILLBY.
RALPH R. BROOKS.